United States Patent

Pfannenschmidt

[11] Patent Number: 5,615,707
[45] Date of Patent: Apr. 1, 1997

[54] APPARATUS FOR JOINTLY ACTUATING A PAIR OF VALVES

[76] Inventor: Erhard Pfannenschmidt, Kriegkamp 12, D-22147 Hamburg, Germany

[21] Appl. No.: 459,733

[22] Filed: Jun. 2, 1995

[30] Foreign Application Priority Data

Jun. 3, 1994 [DE] Germany .......................... 44 19 545.1

[51] Int. Cl.⁶ .................................................. F16L 37/28
[52] U.S. Cl. ................... 137/614.06; 137/614.05; 137/637.1; 251/232
[58] Field of Search ............... 137/614.02, 614.05, 137/614.06, 637.1, 614.11; 251/232, 237

[56] References Cited

U.S. PATENT DOCUMENTS

| | | | |
|---|---|---|---|
| 4,846,225 | 7/1989 | Scobie et al. | 137/637.1 |
| 4,890,643 | 1/1990 | Oliver | 137/614.11 |
| 5,083,588 | 1/1992 | Truchet | 137/614.02 |

FOREIGN PATENT DOCUMENTS

| | | |
|---|---|---|
| 9112352 | 4/1992 | Germany . |
| 4218372 | 10/1993 | Germany . |

*Primary Examiner*—A. Michael Chambers
*Attorney, Agent, or Firm*—Faegre & Benson LLP

[57] ABSTRACT

An apparatus for jointly actuating a pair of valves, in particular coupling members having closure valves and having actuating shafts each of which is connected to a cam for sequentially operating the actuating shafts where the cams each have receiving portions for the dog member such that pivoting of the actuating lever about 45° causes the first cam to be rotated about 90° and further pivoting of the actuating lever about another 45° causes the second cam to be rotated also about 90°.

7 Claims, 3 Drawing Sheets

APPARATUS FOR JOINTLY ACTUATING A PAIR OF VALVES

The invention relates to an apparatus for jointly actuating a pair of valves, in particular coupling members formed as closure valves, in particular coupling members formed as closure valves having actuating shafts, each of which is connected to a cam for sequentially operating the the actuating shafts to displace the respective closure member from an open to a closed position and vice versa.

The coupling halves of fluid lines which are to be connected to each other usually include closure valves adapted to be closed before the coupling is opened. This prevents outflow of the fluid when the coupling is opened. It has become known to form the coupling members as ball cocks arranged such that, when the ball cock member is in its closed position, there will be no "dead space" for receiving fluid which would flow out after the coupling has been opened. In order to avoid any "dead space" it is necessary for the ball cock members to interengage. As a result the ball cock members when they are opened and closed may be actuated only sequentially in order to avoid any damage.

A structure as discribed above has been disclosed in German 42 18 372 and similar structures are disclosed in U.S. Pat. No. 5,083,588 which is also referred to in the specification of the aforementioned German patent. Additionally German Gebrauchmuster DE-GM 91 12 352 also discloses similar couplings. In such structures there is an apparatus for jointly actuating serially connected ball cock members due to mechanical interference between concave-convex contours of the ball surfaces when the valve is in its closed position. To this end a cam or control disk mounted on the drive shaft of one ball cock valve includes a dog member portion cooperating with a dog member portion of a second cam or control disk mounted on a shaft of a second ball cock valve such that the second cam is driven by the first cam in both directions of rotation for a first distance. The cam is adapted to be coupled via coupling means with the associated actuating shaft for a second distance in both directions of rotation, while it is disengaged from the associated actuating shaft for the first distance. The first cam moves for example through a distance of 180°, while it drives the second cam during its rotation only for a partial distance. The expenditure of such a transmission is relatively high. Furthermore, it requires a 180° actuating device if there are not provided any manual drive means. Commercial drives for such valves usually provide for a drive distance of 90°.

The problem to be solved by the invention is to provide an apparatus for jointly actuating a pair of valves, in particular coupling members formed as closure valves, which is of simple structure and which allows the use of the drives of the 90° displacement angle type.

This problem is solved by the features of the present invention.

In the apparatus of the present invention there is provided an actuating lever which is mounted so as to be pivotal about a pivot axis which is parallel to and fixedly spaced from the axis of a valve actuating shaft. The actuating lever includes a dog member or pin portion which cooperates with both cams such that it rotates the first cam for 90° as its pivot shaft goes through a first displacement angle of 45° and rotates the second cam for 90° as the pivot shaft goes through a further displacement angle of 45°.

In an embodiment of the invention the cams may include radially outwardly open recesses which cooperate with a projecting pin mounted on the actuating lever. When the actuating lever is actuated, the pin or dog engages the inner wall of the recess of one cam and is out of engagement with the recess of the other cam. The desired action of the transmission is obtained by the respective geometrical arrangement of the pivot axis of the actuating lever and corresponding dimensioning of the length of displacement distance of the dog or pin of the actuating lever from the pivot axis relative to the spacing and size of the cams.

In the embodiment of the invention disclosed herein this is obtained by the pivot axis of the actuating lever and the axes of the actuating shafts extending along a rectangular isosceles triangle, with the right-angle being adjacent the pivot axis and the line connecting the pivot axis and the dog member extending through the axis of the first actuating shaft when the actuating lever is in one end position and through the axis of the second actuating shaft when the actuating lever is in the other end position. When the actuating lever is in the center position between its end positions, engagement thereof with one cam is terminated and with the other cam is initiated.

As mentioned above, actuation of the actuating lever can be obtained by a common 90° drive of the pivot axis about which the actuating shaft is driven. The closure valves are operated after the coupling halves have been locked or separated. Furthermore it is possible to provide a second actuating drive for actuating a suitable connecting and separating device in order to lock the coupling halves to each other. One embodiment of such a drive is disclosed in the aforementioned German patent.

According to a further development of the invention one coupling half may have associated therewith a first switch which responds to the coupling halves being in their connecting positions so as to actuate the second actuating drive; the second actuating drive has associated therewith a second switch which is actuated by the second actuating drive when it has reached its locking position, so as to enable actuation of the first actuating drive. Furthermore a third switch can be provided for actuating the first actuating drive when the ball cocks are in their opening positions and to prevent operation of the first actuating drive in the closing position. There can be provided a fourth switch which is actuated when the first actuating drive has moved the ball cocks into their closing positions via the associated actuating shaft, and which enables operation of the second actuating drive.

This control apparatus may cooperate with a so-called tear-off safety means which senses for example the tensile force acting upon the fluid line or hose which is to be coupled with a stationary tube for example. When this tensile force exceeds a predetermined value it is advisable to separate the coupling halves. The tensile force safety means generates a signal for operating the first actuating drive. Only thereafter a further signal for separating the coupling via the second actuating drive may be generated.

In the following the invention will be explained in more detail with reference to the drawings.

Figure 1:
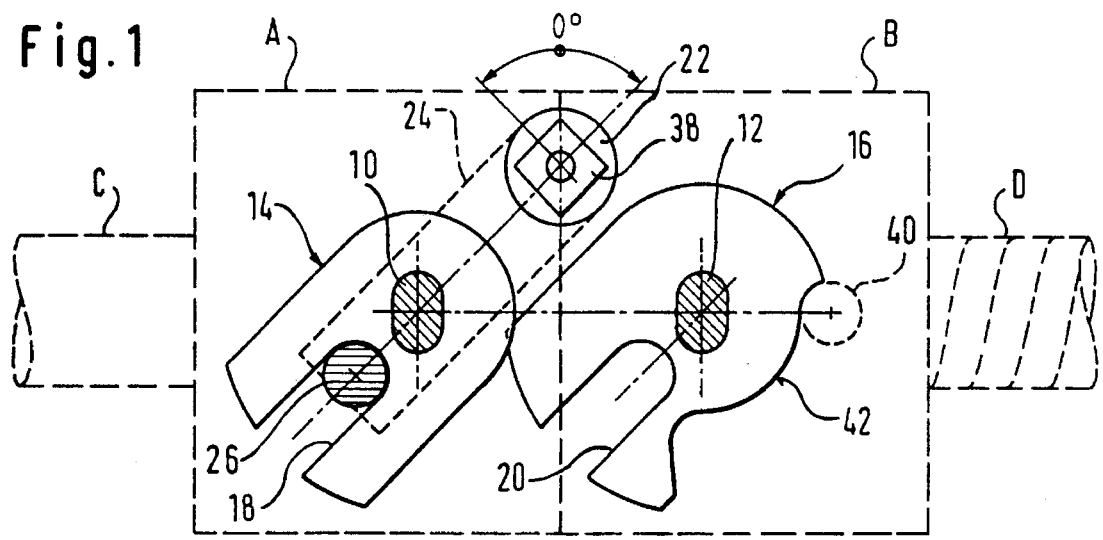
FIG. 1 shows schematically an apparatus of the invention in a first operative position.
Figure 2:
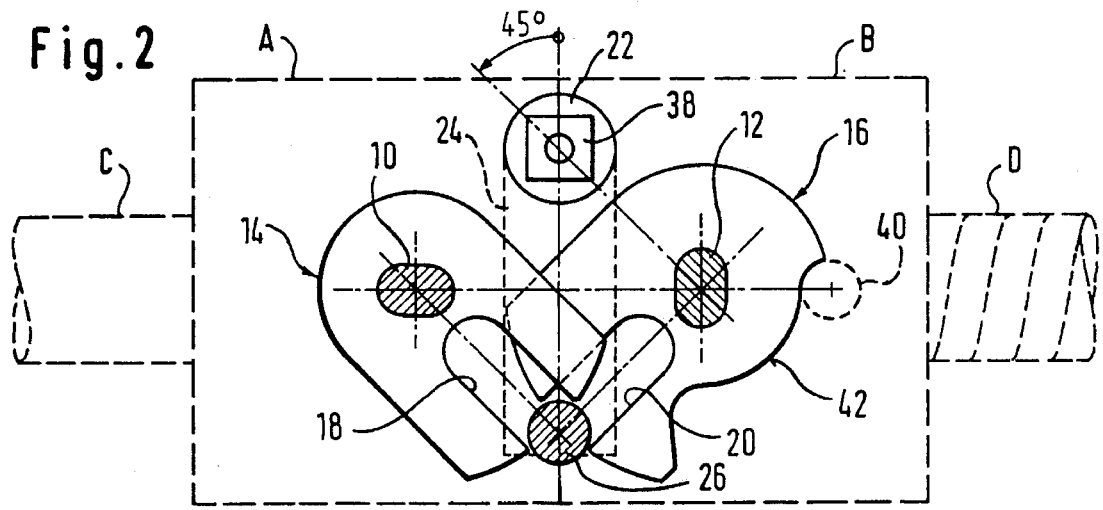
FIG. 2 shows the apparatus of FIG. 1 in a second operative position.
Figure 3:
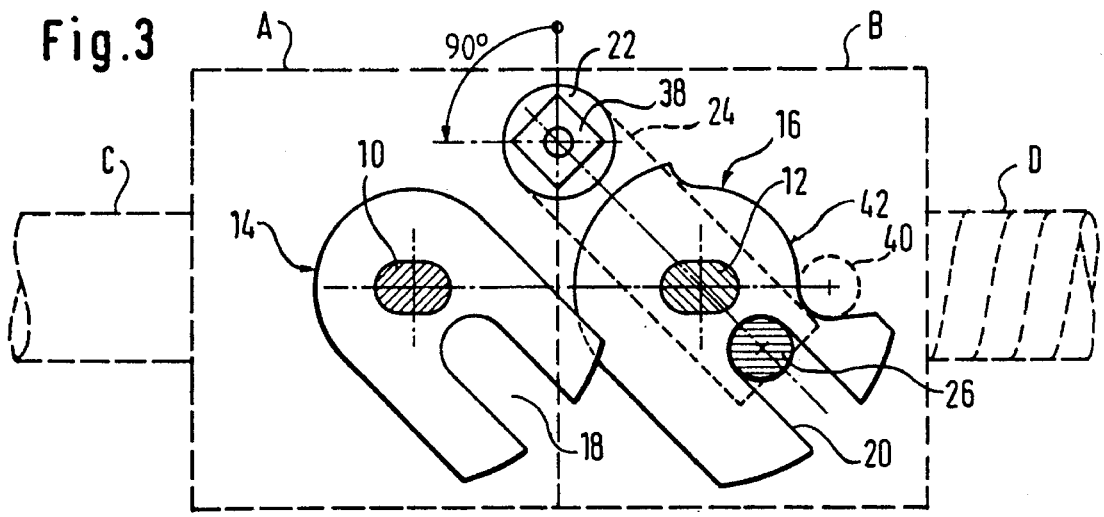
FIG. 3 shows the apparatus of FIG. 1 in a third operative position.

In FIGS. 1 to 3 there are indicated at 10 and 12, respectively, the actuating shafts of ball cocks which are respectively located within coupling halves A and B shown in dashed lines. A more detailed example of such a coupling is disclosed in the above mentioned German 42 18 372. Furthermore it is to be noted that the apparatus as described is not limited to be used with ball cocks formed as coupling members, but may be used for any valves which form parts of couplings or are used otherwise.

A first ball cock coupling half A with an actuating shaft 10 is associated, for example, with a stationary tube C, while an actuating shaft 12 is associated with a coupling half B which is connected to a hose D. A first vdisk-shaped cam or control disk 14 is fixedly mounted to the actuating shaft 10, and a second disk-shaped cam or control disk 16 is fixedly mounted to the actuating shaft 12. The cam 14 has a radially extending, outwardly open slot 18, and the cam 16 has a radially outwardly open slot 20.

Figure 4:
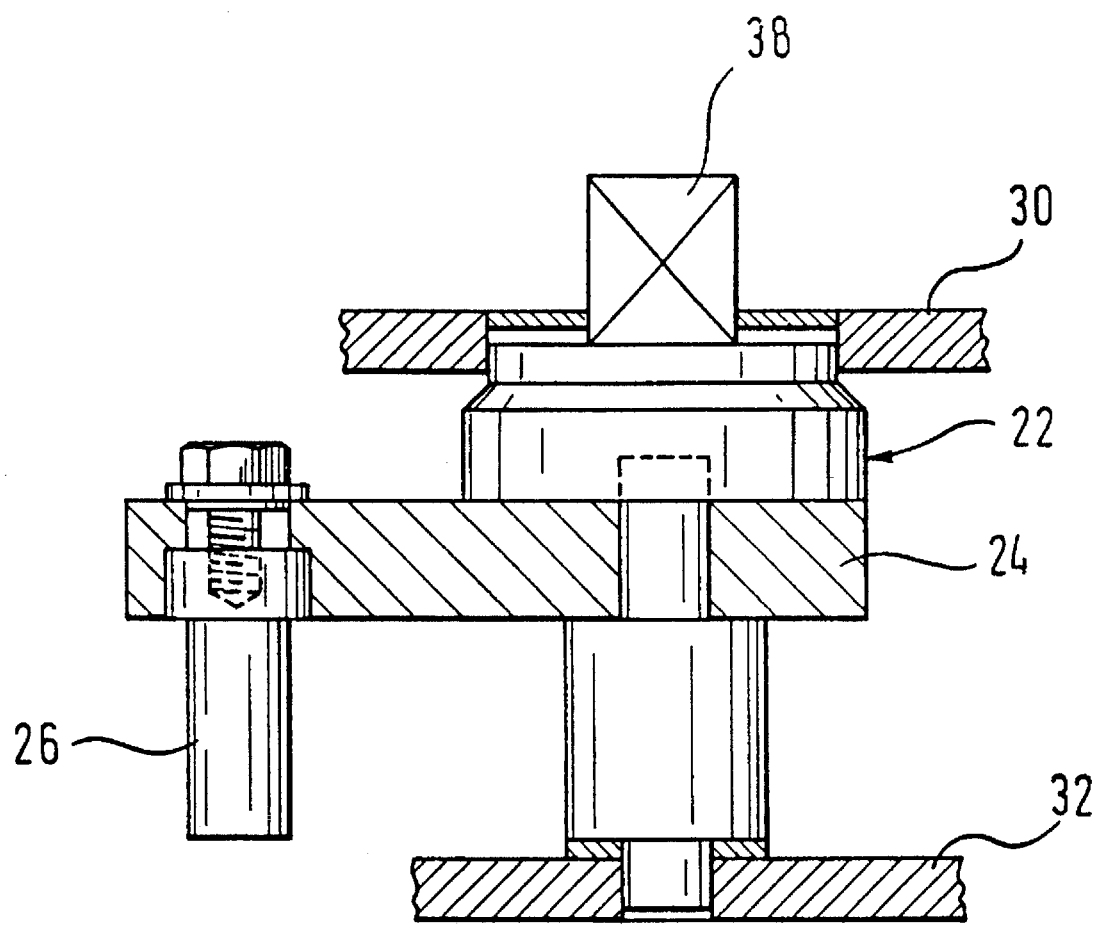
FIG. 4 is a section through the drive lever of the apparatus of FIGS. 1 to 3.

An actuating lever 24, which has been shown in dotted lines for clarity reasons, is mounted by means of a mounting pin 22 which is mounted to the stationary half of the coupling so as to be rotatable about an axis which is parallel to and spaced from the axis of the actuating shaft 10. Actually the actuating lever 24 extends above the cam 14. It has a downwardly extending drive pin 26 at its free end. As may be seen in FIG. 4 the mounting pin 22 is rotatably mounted in a pair of spaced plates 30, 32. They form parts of the stationary half A of the coupling. At its upper end the pin 22 has a square portion 38 for connection with an electrical, pneumatic or hydraulic actuating drive as shown in the German patent or a manual lever rotatable for 90°, by means of which the pin 22 can be rotated back and forth through an angle between 0° and 90°.

As may be seen in FIGS. 1 to 3, the axis of the pin 22 is midway between the axes of the actuating shafts 10, 12. Furthermore, the lines of connection between the axis of the pin 22 and the axes of the actuating shafts 10, 12 form an angle of 90°. When the actuating shafts 10, 12 and, respectively, the cams 14, 16 are in the positions shown in FIG. 1, the closure members or ball cock members of both closure valves are closed. In this position the axis of the slot 18 of the cam 14 is aligned with the line connecting the axis of the pin 22 and the axis of the actuating shaft 10. The axis of the slot 20 extends parallel thereto. The drive pin 26 is within the slot 18 closely adjacent the bottom of the slot 18. When the cams are in this position, the coupling halves can be separated without any interference with the described transmission. An abutment pin, which is indicated at 40, cooperates with a cam surface 42 of the cam 16 so as to limit rotational movements of the cam 16 to an angle of 90° as may be seen from a comparison of FIGS. 1 and 3.

Cooperation of pin 40 and cam surface 42 may be such that a predetermined force is required to rotate the cam 16. This detent force prevents opening of the ball cock by inadvertent movements of the cam 16 when the coupling half has been separated.

When the lever 24 is rotated for an angle of 45° by means of the not shown actuating drive, the cam 14 is rotated for an angle of 90° thereby (cf. FIG. 2). This is a result of the described geometry of the lever 24, dog member 26 and cam 14. The length of the slot 18 is dimensioned such that further rotation of the lever 24 beyond 45° causes the drive pin 26 to leave the slot 18. At the same time the pin 26 moves into the slot 20 of the cam 16 which is disposed below the cam 14. Rotation of the lever 24 from 45° to 90°, accordingly, results in rotation of the cam 16 also for 90° as shown in FIG. 3.

In FIG. 2 the position of the actuating shaft 10 indicates that the ball cock member associated therewith is in its "open" position. As shown in FIG. 2 the ball cock member of the actuating shaft 12 remains in its closed position.

In FIG. 3 both ball cock members are in their opening positions as indicated by the positions of actuating shafts 10 and 12. Accordingly the shown transmission enables sequential actuation of the closure members with movement of the actuating drive through a 90° displacement angle.

As may be seen further in FIG. 3 engagement of the drive pin 26 at the bottom of slot 20 while further motion is restricted by abutment pin 40 interfering with cam sholder 42 uprovides for a positive locking action which mechanically resists separation of the coupling members. Independent of whether a drive for locking the coupling members has been activated, the coiupling halves remain connected to each other until the drive pin 26 has been released from the slot 20.

Actuation of the closure members within the coupling halves is obtained by means of a single drive which is positioned in the present case upon the so-called stationary half. A further, separate, actuating drive at the stationary half A serves to lock the coupling halves to each other as shown in more detail in the German patent.

Figure 5:
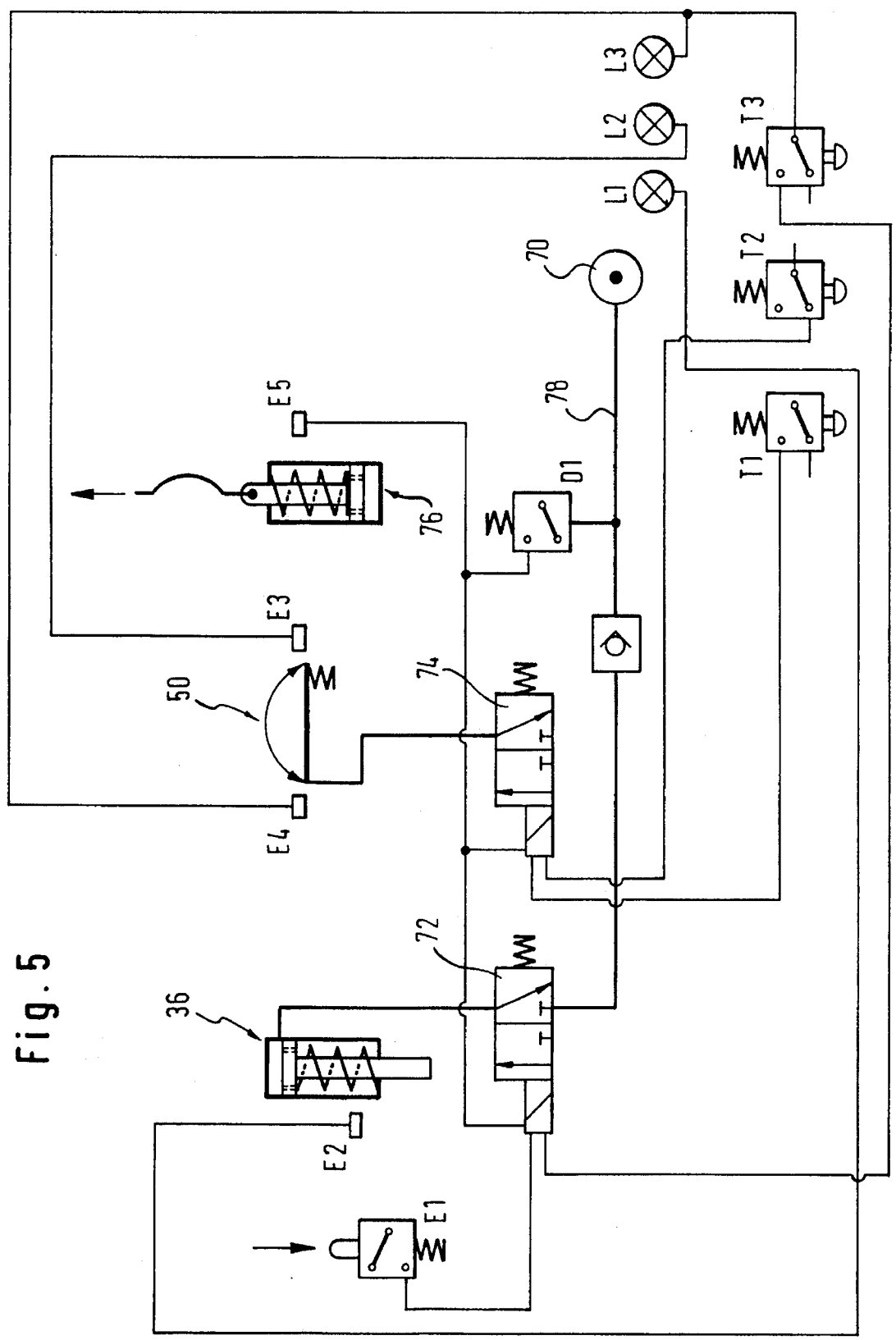
FIG. 5 shows schematically a circuit diagram of an electropneumatic control for a coupling in connection with the apparatus of FIGS. 1 to 3.

In FIG. 5 a circuit for actuating and, respectively, controlling the two actuating drives has been indicated. In FIG. 5 the first actuating drive has been designated by 50. It serves to actuate the lever 24. The second actuating drive has been designated by 36. It has associated therewith a limit switch E2, while the actuating drive 50 has associated therewith a pair of limit switches E3 and E4. The drives 36, 50 are operated by means of a pressure air source 70 via solenoid actuated more-way-valves 72, 74. A tear-off safety device 76 senses the tensile force for example of a hose with which the coupling half is connected. A limit switch E5 is actuated in response to the tensile force exceeding a predetermined value. The stationary coupling half has associated therewith a limit switch E2 which is actuated when the free coupling half engages the fixed coupling half. The pressure switch D1 is associated with the line 78 to the valve 72, 74 and is responsible to the pressure in line 78 decreasing below a predetermined value. Finally there are provided three touch switches T1, T2, T3 and three lamps L1, L2 and L3. The circuit as shown operates as follows.

When the free coupling half is moved into engagement with the fixed coupling half, switch E1 is activated and automatically initiates operation of the second actuating drive such that connection with the not shown connecting and separating device is effected. As soon a the locking position has been reached, the switch E2 responds. It now enables operation of the first drive for moving the ball cocks to their opening positions when touch switch T1 is operated. When the two ball cocks are in their opening positions (FIG. 3), the switch E3 is activated. In this manner it disables operation of the actuating drive 36 by the touch switch T3. If it is intended to move the ball cocks back to their closing positions, this is achieved via the touch switch T2. When the displacement action has been terminated, the switch E4 is activated so that operation of the unlocking means via the adjusting drive 36 by means of the touch switch T3 may be effected.

The lamps L1, L2 and L3 indicate whether a locking action has been performed by means of the adjusting drive 36 and, respectively, the ball cocks are in their closing or opening positions.

When the tensile force safety device 76 is activated, a signal from the switch E5 initiates operation of actuating drive 50, for example by actuation of switch T2. Thereafter the second actuation drive 36 is automatically actuated to provide for unlocking of the coupling halves. The same action occurs when the pressure switch D1 is activated, which indicates that there is a risk that it is no longer possible to move the ball cock to their closing positions via the drive 50. IF for example the pressure of pressure source 70 is 6 bar, it is for example the pressure switch D1 which is actuated when a pressure of 4 bar prevails in the line 78.

When a current and/or pressure failure occurs it will be sensed via the electric supply and the pressure switch D1, respectively, and the system will operate in the same manner as in the case of the tear-off safety means. The spring bias in the actuating drives 36, 50 causes the ball cock to be moved to their closing positions and allows—thereafter if required—for unlocking of the coupling halves.

I claim:

1. An apparatus for jointly and sequentially actuating a pair of valves associated with coupling members serving as closure valves, having closure members which can be actuated only sequentially from an opened to a closed position and vice versa if the coupling members are coupled, said closure members having actuating shafts each of which is connected to a cam for sequentially operating the actuating shafts to displace the respective closure member from the opened position to the closed position, and vice versa, characterized in that a) an actuating lever (24) connected to manual means or a 90° actuating drive (50) is mounted so as to be pivotal about an axis (22) which is parallel and spaced from the axes of the actuating shafts (10, 12), b) a single dog member (26) is provided on the actuating lever (24) in spaced relationship to the pivot axis, and c) the cams (14, 16) have receiving portions (18, 20) for the dog member (24) such that in a first pivoting step of the actuating lever (24) about 45° the actuator causes the first cam (14) to be rotated about 90° and in a second pivoting step of the actuating lever (24) about another 45° the actuator causes the second cam (16) to be rotated also about 90°.

2. An apparatus according to claim 1, characterized in that the receiving portions (18, 20) of both cams (14, 16) comprise radially extending, outwardly open, slot-like recesses into which the pin-shaped dog member (26) of the actuating lever (24) engages.

3. An apparatus according to claim 1, characterized in that the pivot axis of the actuating lever (24) and the axes of the actuating shafts (10, 12) extend along a rectangular isosceles triangle, with the right-angle being adjacent the pivot axis and the line connecting the pivot axis and the dog member (26) extending through the axis of the first actuating shaft (10) when the actuating lever is in one end position and through the axis of the second actuating shaft (12) when the actuating lever is in the other end position.

4. An apparatus according to claim 1, characterized in that the second cam (16) has associated therewith rotation limiting means (40) preventing rotational movements beyond the angle of rotation of 90° between the opening and closing positions.

5. An apparatus according to claim 1, characterized in that a first actuating drive (50) is coupled to the actuating lever (24), a second actuating drive (36) is arranged to operate a connection and separation device mounted to one coupling half, whereby the coupling halves are locked in a connection position, one coupling half has associated therewith a first switch (E1) arranged to be responsive to the coupling halves being in their connection position so as to actuate the second actuating drive (36), the second actuating drive (36) has associated therewith a second switch (E2) arranged to be operated by the second actuating drive (36) when it has reached its locking position so as to release and enable the first actuating drive (50) to be actuated, there is provided a third switch (E3) arranged to operate the first actuating drive (50) when the closure valves formed as ball cocks are in their opening position, and to prevent operation of the first actuating drive (50) in the closed position, and there is provided a fourth switch (E4) which is actuated when the first actuating drive (50) has moved the ball cocks via the associated actuating shafts to the closed positions, so as to release and enable the second actuating drive (36) to be operated.

6. Apparatus according to claim 5, characterized in that a movable conduit has associated therewith tensile force safety means (76) including a switch (E5) which is responsive to the tensile force of the movable conduit exceeding a predetermined value so that the tensile force safety means (76) initially actuates the first actuating drive (50) and thereafter the second actuating drive (36).

7. An apparatus according to claim 5, characterized in that the first and second actuating drives (50, 36) are of the pneumatic or hydraulic type and a supply line (78) for said drives (50, 36) has associated therewith pressure monitoring means (D1) responsive to the pressure being below a predetermined value whereby the first and second actuating drives (50, 36) are operated.

* * * * *